United States Patent
Ferguson

(10) Patent No.: US 6,361,207 B1
(45) Date of Patent: Mar. 26, 2002

(54) TEMPERATURE SENSING TERMINATION

(75) Inventor: Donald A. Ferguson, Stuart, FL (US)

(73) Assignee: Florida RF Labs, Inc., Stuart, FL (US)

(*) Notice: Subject to any disclaimer, the term of this patent is extended or adjusted under 35 U.S.C. 154(b) by 0 days.

(21) Appl. No.: 09/325,360

(22) Filed: Jun. 4, 1999

(51) Int. Cl.[7] .............................. G01K 7/22; H01P 1/24
(52) U.S. Cl. ...................... 374/185; 374/101; 333/22 R
(58) Field of Search ................................ 374/101, 102, 374/107, 112, 114, 183, 185, 178; 338/22 R, 23; 333/22 R; 257/467

(56) References Cited

U.S. PATENT DOCUMENTS

| | | | | |
|---|---|---|---|---|
| 4,210,024 A | * | 7/1980 | Ishiwatari et al. | 374/183 |
| 4,260,943 A | * | 4/1981 | Zaderej et al. | 320/140 |
| 4,310,837 A | * | 1/1982 | Kornrumpf et al. | 340/598 |
| 4,450,496 A | * | 5/1984 | Doljack et al. | 361/58 |
| 4,470,711 A | * | 9/1984 | Brzozowski | 374/179 |
| 4,700,130 A | * | 10/1987 | Bloemen | 324/110 |
| 4,730,228 A | * | 3/1988 | Einzinger et al. | 361/103 |
| 4,789,823 A | * | 12/1988 | Delfs et al. | 324/95 |
| 4,860,166 A | * | 8/1989 | Nicholls | 361/792 |
| 4,982,422 A | * | 1/1991 | Itoh et al. | 379/324 |
| 5,064,997 A | * | 11/1991 | Fang et al. | 219/505 |
| 5,302,024 A | * | 4/1994 | Blum | 374/122 |
| 5,370,458 A | * | 12/1994 | Goff | 374/122 |
| 5,537,288 A | * | 7/1996 | Felps | 361/124 |
| 5,604,419 A | * | 2/1997 | Bisschop et al. | 320/35 |
| 5,686,872 A | * | 11/1997 | Fried et al. | 333/22 R |
| 5,867,083 A | * | 2/1999 | Takeuchi et al. | 337/1 |
| 6,011,438 A | * | 1/2000 | Kakuta et al. | 330/262 |
| 6,147,481 A | * | 11/2000 | Mazzochette et al. | 324/95 |

FOREIGN PATENT DOCUMENTS

| | | | | |
|---|---|---|---|---|
| JP | 0116629 | * | 6/1986 | 374/102 |

OTHER PUBLICATIONS

Terminations and Resistors, SmartLoad Power Sensing Terminations, EMC Technology, Inc., pp. 30–31 (No date).
Component Reference Sheet, Model No. 34–1002, Temperature Sensing High Power Termination, Florida RF labs, Inc., pp. 1–2, Jan. 1999.

* cited by examiner

*Primary Examiner*—Diego Gutierrez
*Assistant Examiner*—Lydia M. De Jesús
(74) *Attorney, Agent, or Firm*—Gunster, Yoakley & Stewart, P.A.

(57) ABSTRACT

An electrical termination system (100) includes a monolithic electrical termination device (101) for providing an electrical termination to an electrical circuit. The device (101) includes a ceramic substrate (106) supporting an RF termination resistor element (102) and a thermistor element (104) and providing a fast temperature conducting path therebetween. A ceramic cover (105) and the ceramic substrate (106) provide an enclosure enclosing the RF termination resistor element (102) and the thermistor element (104). The thermistor element (104) senses a temperature corresponding to the RF termination resistor element (102) and provides a signal representative of the temperature sensed by the temperature sensor element (104). Optionally, a second thermistor (118) outside the monolithic electrical termination device (101) senses an ambient temperature and provides a second signal to compare with the signal from the thermistor element (104) to indicate a change in temperature of the RF termination resistor element (102).

17 Claims, 1 Drawing Sheet

TEMPERATURE SENSING TERMINATION

FIELD OF THE INVENTION

This invention relates in general to electrical termination systems, and more particularly to an electrical termination device that additionally provides temperature sensing and a temperature indication signal.

BACKGROUND OF THE INVENTION

Electrical termination systems are commonly used for providing electrical termination to electrical signals present in electrical circuits. Typically, an electrical termination system attempts to provide a predefined impedance or load, such as a fifty ohm impedance, between a signal line and a reference line, such as a ground reference, in an electrical circuit. Ideally, a termination system should provide a constant predefined impedance for a wide range of electrical signal frequencies. Examples of termination systems include, but are not limited to, radio frequency (RF) loads for frequency circulators, couplers, power combiners, absorptive filters, and antenna replacement dummy loads.

Temperature sensing terminations are generally utilized in feedback systems used for fault detection. When a high power termination sees high power, normally this is an indication that something in the system is broken. Therefore, it is generally useful to detect when high power is dissipated in the termination and either remove the power source or throttle it back by some measure to prevent other system damage from occurring.

The most common application of a feedback system is one in which a signal is normally not present until something is broken. The sensor is used to detect a sudden increase in power level from some low level leakage value. For example, in a conventional 100 watt system, the power dissipated in a termination in normal operation would be typically less than one watt, or less than one percent of its power rating. If something then fails in the system, there is a sudden step increase in power from that one percent to nearly 100 percent. Typical applications would include use of a termination on a circulator to terminate reverse power or use of a termination on a coupler in between balanced amplifier stages where no power would be present until the amplifier stages became imbalanced. Less common applications include systems where terminations are used in the presence of some ambient power that needs to be monitored for changes or, in some cases, for signal removal, indicating the end of a fault condition.

There are two basic approaches utilized in the conventional technology. These are RF detection and thermal detection. Regarding RF detection, one approach is to take a coupling device and, sampling a small portion of the RF signal going into the termination, feed the sample to a low power detector such as a diode or semiconductor detector which detects the fault condition. Another approach would be to use a very high value attenuator in place of the termination. The attenuator would not only terminate the RF signal but also sample a portion of that signal to be sent to a low power detector such as a diode or semiconductor detector which would detect the fault condition. There are disadvantages to the conventional approaches of RF detection. By definition, there is RF going into and out of the sensing device so that it is necessary to maintain good RF design principles when taking the sample signal and transmitting it to the sensor. The sample is a low level signal in the presence of a high level signal somewhere in the system. Therefore, there is a chance for crosstalk or false alarming if the two signals do not remain separated. Also, the use of a semiconductor device is a relatively high cost approach which requires a number of components and is relatively complex to design. Yet another disadvantage, in regard to the use of a high power RF attenuator where more than one resistor element is present, the junctions between the resistor elements form unwanted parasitic reactance in the design, which makes it more difficult to achieve a low VSWR, voltage standing wave ratio.

Another conventional RF approach is to use a low power thermistor termination. The thermistor provides both the termination and temperature sensing features. RF power is driven directly into the thermistor device itself to self-heat the thermistor and change its power level. This low power, self-heating device is used in place of a diode or semiconductor-type detector. A disadvantage is that it is strictly for low power applications. It cannot be used directly as the termination in a high power system. A coupler or high value attenuator would be required to support it.

Another disadvantage is, because the RF signal is passing through the thermistor, it is necessary to filter away the AC signal to leave the remaining DC information. The fact that the RF passes through the thermistor, which has a nominal impedance of about 50 ohms, means that the source impedance of the sensor is nearly 50 ohms. The lower the impedance of the sensor, the more difficult it is to filter the RF. Yet another disadvantage is, since all of the sensing is done in a device, it is difficult to separate the ambient temperature from the temperature derived from dissipating power.

In regard to thermal detection, external variable resistant devices or thermistors are glued or mechanically attached to a high power termination and used to detect when the entire body of the device heats up. There are disadvantages to this approach also. One disadvantage is that the external device is not tightly coupled to the termination resistor element so there may be a significant time lag between when the temperature dissipation occurs in the resistor element and when the sensor detects the corresponding temperature. Also, the presence of the sensor in close proximity to the electrical field generated by the RF termination will, in many cases, de-tune the RF characteristics that were designed into the termination device.

Thus, there exists a need for a temperature sensing termination system that does not have the disadvantages of the prior art.

DESCRIPTION OF THE PREFERRED EMBODIMENT

Figure 1:
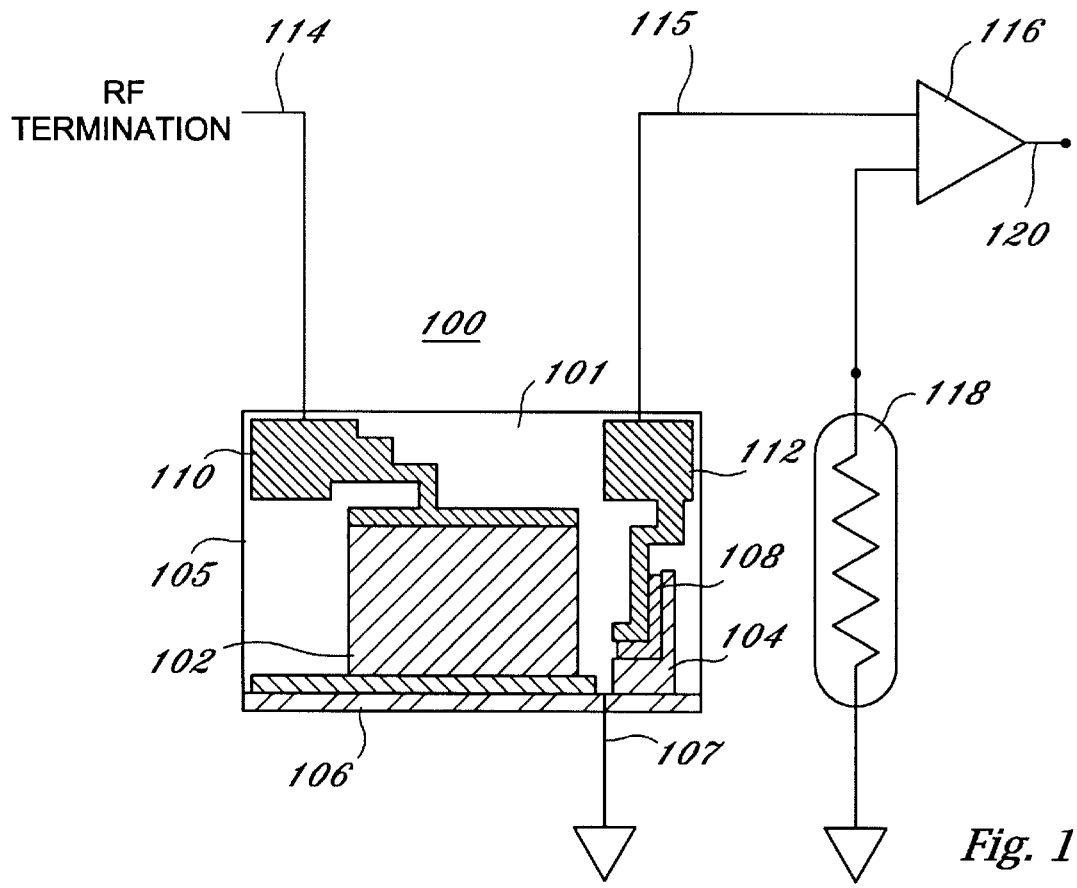
FIG. 1 is a top cut-away view of a temperature sensing termination device being illustrated in an exemplary temperature sensing termination system according to a preferred embodiment of the present invention.

Referring to FIG. 1, an exemplary temperature sensing termination system 100 includes a temperature sensing termination device 101 fabricated in a monolithic chip arrangement. The monolithic chip 101 includes a ceramic substrate 106 and a ceramic cover 105 structure to form an enclosure that substantially encloses a termination resistive element 102. The ceramic substrate 106 and cover 105 are preferably constructed from beryllium. However, those of ordinary skill in the art can appreciate that the construction of the substrate 106 and cover 105 is not limited to ceramic or to beryllium in accordance with the present invention.

The termination device 101 also has conductive metal patterns or contacts 110 and 112. A first electrical contact 110 provides an RF signal termination input 110. A second electrical contact provides a temperature sensor signal output 112. The conductive metal patterns 110 and 112, as shown, are electrically coupled to two separate electrical elements 102 and 104 in the device 101. An electrical termination element 102, preferably comprising a resistive element, provides an electrical termination to an electrical circuit such as via the electrical circuit path 114 and the return circuit path 107 as shown. A temperature sensor element 104, preferably comprising a temperature varying resistive element such as a thermistor, senses a temperature corresponding to the electrical termination element 102 and provides a sensor output signal representative of the temperature sensed by the temperature sensor element 104. The signal is provided to a sensor output circuit, such as illustrated in FIG. 1 being provided between a sensor output reference line 115 and a return, or ground reference, line 107. Alternative topologies of sensing circuits that could utilize the temperature sensing device 101 are reasonably anticipated by one of ordinary skill in the art. For example, and not as a limitation, the device 101 could be useful in many different applications such as with current-loop sensing circuits, voltage controlled oscillator circuits, biased amplifier circuits, differential comparator circuits, triggering circuits, alarm circuits, counting circuits, logic circuits, computer circuits, etc.

The electrical termination element 102 can be a metallic alloy such as Nichrome or a thick film type device which would be a metal alloy matrix in a glass or other type structure which is cintered in place. The electrical termination element 102 receives the high power RF signal and is matched in impedance for a range of frequencies to absorb the signal and reflect very little of the signal back.

Figure 2:
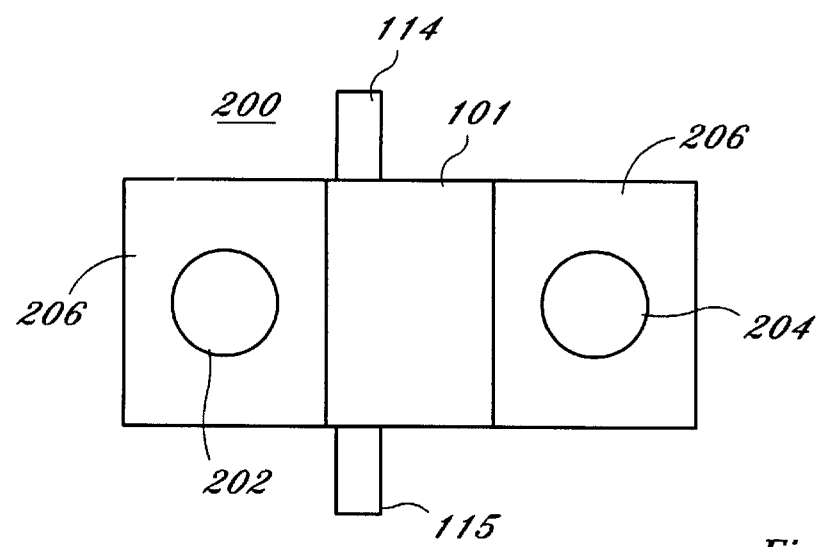
FIG. 2 is a top planar view of an exemplary temperature sensing termination device according to a preferred embodiment of the present invention.

The electrical termination element 102 is mechanically coupled to the substrate 106 so that waste heat generated by the termination element 102 can be thermally conducted through the substrate 106 to its bottom side which is then attached to some heat sinking device. It may be attached directly to a flange mounting element 206, as shown in FIG. 2, for mounting on a heat sinking and electrical ground reference. The user could additionally, or in an alternative embodiment, attach the device 101 directly to a heat sink structure. Referring to FIG. 1, heat does not flow vertically downward from the termination element 102 directly through the substrate 106 to an external heat sink structure. There will always be a heat spreading effect occurring across the substrate 106. This thermal dispersion across the substrate 106 provides a fast thermal conduction path from the termination element 102 to the temperature sensing element 104.

The temperature sensing element 104, in a preferred embodiment of the present invention, comprises a thick film thermistor. It can be manufactured with a variety of materials, such as a thick film resistor and/or various thin film deposited alloys, which have a changing resistance with changing temperature of the materials. The temperature sensing element 104, being in close proximity with the termination element 102, detects the waste heat which is generated by the termination element 102 and then the temperature sensing element 104 changes its electrical resistance in proportion to the "sensed" waste heat at the temperature sensing element 104. In one sensing circuit topology, the temperature sensing element 104 is coupled to ground 107 and to a sensor output line 115 electrically coupled to the sensor output electrical contact 112.

The electrical termination element 102 and temperature sensing element 104 are mechanically coupled to the temperature conducting substrate 106 such that the temperature sensing element 104 senses via the substrate 106 a temperature corresponding to the termination element 102. The substrate 106 is mechanically coupled to the temperature sensing element 104 and to the termination element 102, and preferably the two elements 102, 104, are located in close proximity and on the same substrate surface area, to provide a fast temperature conducting path between the termination element 102 and the sensor element 104. This preferred arrangement of the present invention provides a fast temperature conducting path for quick response to temperature changes which is a significant advantage of a preferred embodiment of the present invention that is not found in any of the known prior art termination systems.

In a monolithic device embodiment, there may also be a polymer or epoxy protective coating painted or screen printed on the outer surface of the device 101. This coating provides only an environmental seal and normally has no electrical effect on the device 101. In conventional termination devices, however, an external coating, such as using a polymer or epoxy, can add thermal insulating and/or thermal attenuating properties to such a device. This unfortunately can delay a certain temperature conduction out of the device to an external temperature sensing device. Therefore, a temperature sensing configuration that relies on a temperature sensing device located external to a termination device, such as found in the prior art, has the unfortunate disadvantage that it inherently provides only a slow conductive path to heat thereby delaying the detection of a corresponding temperature for a termination element in the device. This added delay could detrimentally impact the performance of a power system. For example, a delay in temperature detection outside of a termination device could delay detection of a power fault condition. A delay in shutting down power to a power system, could potentially cause unnecessary damage and stress to a power system due to the delay.

In another preferred embodiment of the present invention, an RF compensating element 108, such as an inductive or a capacitive element, may be added to provide a substantially tuned RF performance of the electrical termination element 102 and the temperature sensing element 104. The RF compensating element 108, although shown internal to the device 101, may be either internal or external to the device 101. In a preferred embodiment, at least one RF compensating element 108 is electrically coupled to the temperature sensing element 104 in a parallel, series, or mixed circuit configuration. The exemplary RF compensating element 108, as shown in FIG. 1, comprises a parasitic capacitor that is used to reduce the amount of coupled RF energy which may be present on the temperature sensing element 104. Due to the close physical proximity of the termination element 102 to the temperature sensing element 104, some of the RF signal applied to the termination element 102 may electrostatically couple to the sensor output 112. The use of the RF compensating element 108 in the sensor circuit will tend to reduce the presence of unwanted RF energy at the sensor output 112. A significant advantage of the present invention is the ability to tune the RF characteristics of a sensing circuit to a termination circuit by a design of a device 101.

In yet another preferred embodiment of the present invention, two ribbon type tab contacts or leads 114 and 115, as shown in FIG. 2, may be soldered directly to the conductive metal patterns or contacts 110 and 112, respectively electrically coupled to the electrical termination element 102 and the temperature sensing element 104. A ceramic cover is added to seal the device 101 from external elements and to mechanically re-enforce the tab contacts 114 and 115. In addition, a mounting flange 206 with two screw holes 202 and 204, as shown in FIG. 2, may be added for users wishing to mount the device 101 with hardware, e.g., screws or other such fasteners, rather than by soldering or epoxying the device 101 to a heat sink. In still another embodiment, the device would be fully enclosed in a metallic enclosure to make the device EMI shielded so that there would be no parasitic radiation of RF energy or electrical fields from the device 101.

In still another preferred embodiment of the present invention, a second temperature sensing element 118, as illustrated in FIG. 1, is added for sensing the ambient temperature corresponding to the electrical termination system 100. The second temperature sensing element 118 can be situated, either internal or external of the device 101. However, in a preferred embodiment, the second temperature sensing element 118 is preferably situated so as to avoid a fast temperature conducting path 106 with the termination element 102.

In a preferred application, the second temperature sensor 118 will have the same electrical characteristics as the first temperature sensor 104, though this is not required. The signal from the second temperature sensor 118 may be biased 116 with the signal from the first temperature sensor 104, such as via a comparator circuit 116, to indicate with an output signal 120 that a temperature of the termination element 102 has changed regardless of any change in ambient temperature. That is, ambient temperature changes should generally equally affect both sensors 104 and 118. By sensing only the differences between the two sensors 104 and 118, a differential signal 120 indicates when a temperature of the termination element 102 has significantly changed due to experiencing a change in termination power in the termination element 102.

The present invention provides many significant advantages over the known prior art termination systems. By sharing the same ceramic substrate 106, there is a very close thermal conductivity and coupling between the electrical termination element 102 and the temperature sensing element 104, so they track well in temperature. Also, because the temperature sensing element 104 is physically located closely with the termination element 102 there is a much faster reaction time due to the prompt propagation velocity of thermal energy from one element 102 to the other element 104.

The invention does not require an external coupling device or high power attenuator in order to terminate a high power signal and sample a portion of it, nor does it require an external diode or semiconductor detector to detect a fault condition. The invention terminates directly the high power signal internally and provides the sensed output. Therefore, it is unnecessary to employ complex and costly RF design principles in a fault detection system. Additionally, since it is unnecessary to maintain a 50 ohm impedance as with conventional RF detection systems, the nominal impedance of the present invention may be much higher, such as ten kilohms or more. The increased impedance of the temperature sensor 104 facilitates greater filtering of unwanted RF in the sensed output. Further, it lends itself well for monitoring circuit applications.

Regarding systems that utilize a single thermistor element in a device to provide both low power termination combined with temperature sensing, the present invention allows for sensing applications in a high power termination environment which is not available in the single thermistor element devices. Additionally, by utilizing a separate temperature sensing element to a termination element the present invention allows enhanced filtering of unwanted RF energy due to higher sensor element impedance. This is not available for a single thermistor element device that must be constrained to an RF termination impedance, such as 50 ohms. Lastly, the separate sensing element 118 of the present invention allows rejecting ambient temperature changes from any detection of changes in temperature of a termination element 102. This ambient temperature rejection advantage is clearly not available in any known prior art termination systems.

In the invention, the manufacturer can design the termination element 102 to take into account any electrical circuit parasitics that are associated with the nearby presence of the temperature sensor element 104. This design approach tends to prevent degradation of the system VSWR, and helps control potential de-tuning, of an RF termination system 100. Therefore, as has been described above, the present invention provides many significant advantages over known prior art termination systems.

While the invention has been described in its preferred embodiments with some degree of particularity, it is understood that this description has been given only by way of example and that many variations can be made thereto without departing from the spirit and scope of the invention as set forth in the claims below.

What is claimed is:

1. An electrical termination device comprising:
   a substrate;
   an electrical termination element provided on the substrate, the electrical termination element electrically terminating an electrical circuit; and
   a temperature sensing element provided on the substrate spaced apart from the electrical termination element, the temperature sensing element being electrically independent of the electrical termination element, the temperature sensing element sensing a temperature corresponding to the electrical termination element and providing a signal representative of the sensed temperature.

2. The electrical termination device of claim 1, wherein the substrate is a thermally conductive substrate, and wherein the temperature sensor element senses via the thermally conductive substrate a temperature corresponding to the electrical termination element.

3. The electrical termination device of claim 2, wherein the electrical termination device is a monolithic device.

4. The electrical termination device of claim 1, wherein the electrical termination device is a monolithic device.

5. The electrical termination device of claim 1, wherein the electrical termination element comprises a resistive element, and wherein the temperature sensor element comprises a thermistor.

6. An electrical termination device comprising:
   a substrate;
   an electrical termination element provided on the substrate spaced away from the electrical termination element, the electrical termination element electrically terminating an electrical circuit; and
   a temperature sensing element provided on the substrate, the temperature sensing element being electrically independent of the electrical termination element, the temperature sensing element sensing a temperature corresponding to the electrical termination element and providing a signal representative of the sensed temperature, wherein the electrical termination element comprises an RF resistive element, and wherein the temperature sensor element comprises a thermistor and at least one RF compensating element to provide a substantially tuned RF performance of the RF resistive element and of the thermistor, and wherein the thermistor provides the signal therefrom.

7. A monolithic electrical termination device comprising:

a resistor, the resistor electrically terminating an electrical circuit;

a temperature varying element electrically independent of the resistor and thermally coupled to the resistor, the temperature varying element sensing a temperature corresponding to the resistor and providing a signal corresponding to the temperature sensed by the temperature varying element; and a ceramic substrate, the resistor and the temperature varying element being provided on the substrate spaced apart from each other for the temperature varying element to sense a temperature corresponding to the resistor.

8. The monolithic electrical termination device as recited for claim 7, further comprising a ceramic cover mechanically coupled to the ceramic substrate for at least substantially enclosing the resistor and the temperature varying element in the monolithic electrical termination device.

9. The monolithic electrical termination device as recited for claim 7, wherein the temperature varying element comprises a thermistor.

10. A monolithic electrical termination device comprising:

a resistor, the resistor electrically terminating an electrical circuit; and a temperature varying element temperature conductively coupled to the resistor, the temperature varying element sensing a temperature corresponding to the resistor and providing a signal corresponding to the temperature sensed by the temperature varying element, wherein the resistor comprises an RF resistive element, and wherein the temperature varying element comprises a thermistor and at least one RF compensating element to provide a substantially tuned RF performance of the RF resistive element and of the thermistor, and wherein the thermistor provides the signal therefrom.

11. An electrical termination system comprising:

an electrical termination element, the electrical termination element electrically terminating an electrical circuit;

a first temperature sensor element sensing a temperature corresponding to the electrical termination element and providing a first signal representative of the temperature sensed by the first temperature sensor element;

a second temperature sensor element sensing an ambient temperature corresponding to the electrical termination system and providing a second signal representative of the temperature sensed by the second temperature sensor element, the first signal being comparable to the second signal to indicate a temperature change of the electrical termination element relative to the ambient temperature of the electrical termination system; and a ceramic substrate, the electrical termination element and the first temperature sensor element being provided on said ceramic substrate spaced apart from each other to define a thermally conductive path between the electrical termination element and the first temperature sensor element, wherein heat flow from the electrical termination element is substantially unabated to the first temperature sensor element.

12. The electrical termination system according to claim 11, further comprising a ceramic cover mechanically coupled to the ceramic substrate to provide an enclosure substantially enclosing the electrical termination element and the first temperature sensor element.

13. The electrical termination system according to claim 11, wherein the second temperature sensor element is distal to the electrical termination element to define a thermally insulated path between the electrical termination element and the first temperature sensor element, wherein heat flow is substantially abated between the electrical termination element and the second temperature sensor element.

14. The electrical termination system according to claim 11, wherein the first temperature sensor element comprises a thermistor.

15. The electrical termination system according to claim 11, wherein the electrical termination element comprises an RF resistive element, and wherein the first temperature sensor element comprises a thermistor, and wherein the thermistor provides the first signal therefrom.

16. The electrical termination system according to claim 15, further comprising at least one RF compensating element electrically coupled to the first temperature sensor element to provide a substantially tuned RF performance of the RF resistive element and of the first temperature sensor element.

17. The electrical termination system according to claim 11, wherein the electrical termination element is proximate to the first temperature sensor element to define a thermally conductive path between the electrical termination element and the first temperature sensor element, and wherein the second temperature sensor element is distal to the electrical termination element to define a thermally insulated path between the electrical termination element and the second temperature sensor element.

* * * * *